J. M. FAULK.
ATTACHMENT FOR WHEELS.
APPLICATION FILED OCT. 10, 1918.
1,312,437.
Patented Aug. 5, 1919.
3 SHEETS—SHEET 1.
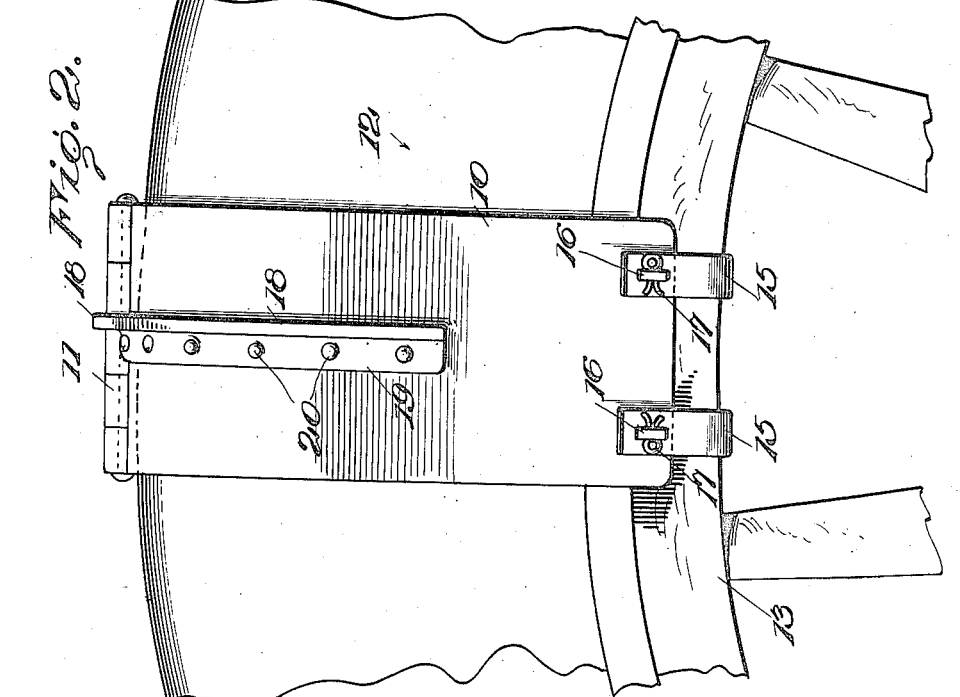
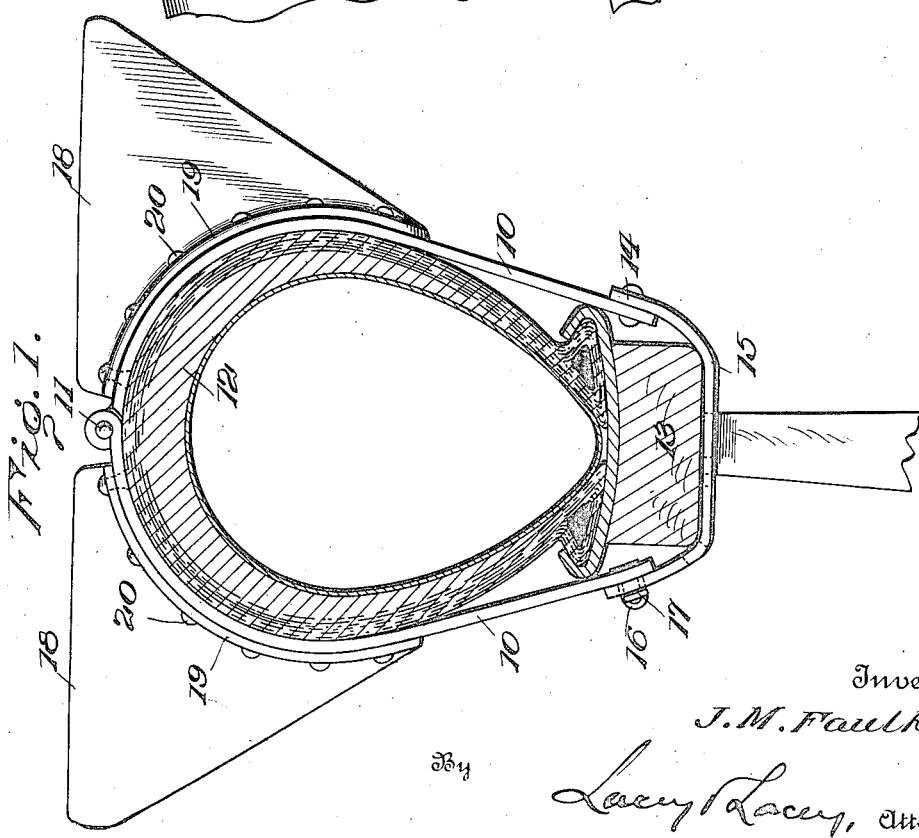
Inventor
J. M. Faulk.
By Lacey & Lacey, Attorneys J. M. FAULK.
ATTACHMENT FOR WHEELS.
APPLICATION FILED OCT. 10, 1918.
1,312,437.
Patented Aug. 5, 1919.
3 SHEETS—SHEET 2.
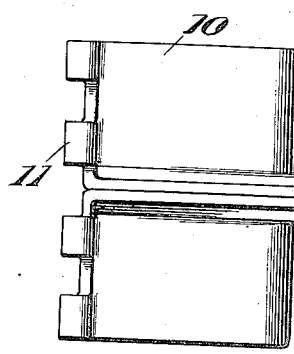
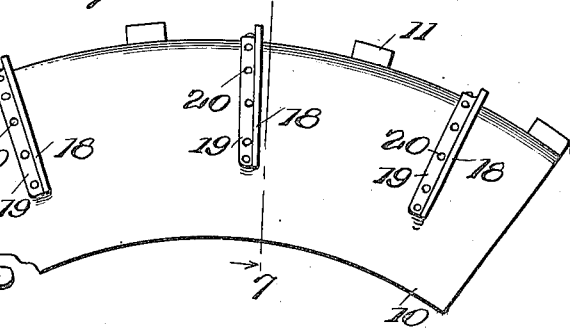
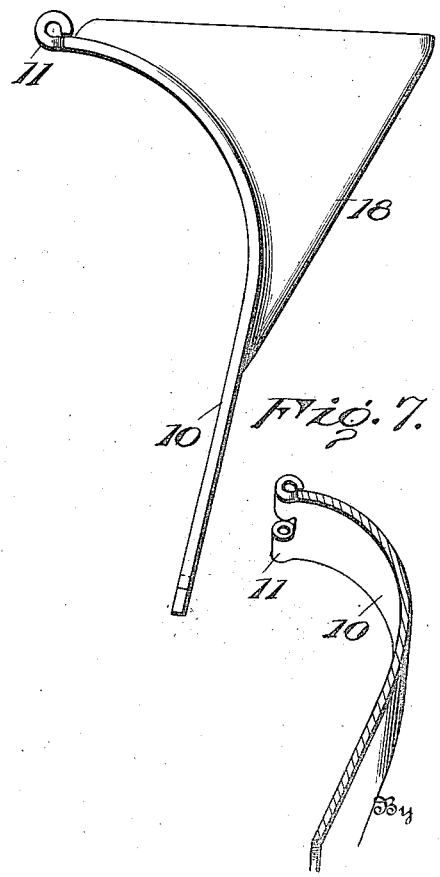
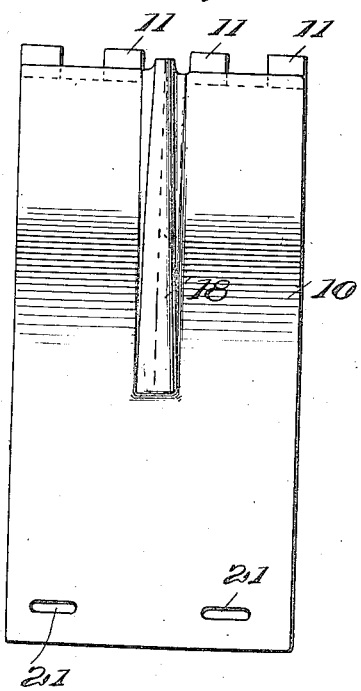
Inventor
J. M. Faulk.
By Lacy & Lacy, Attorneys

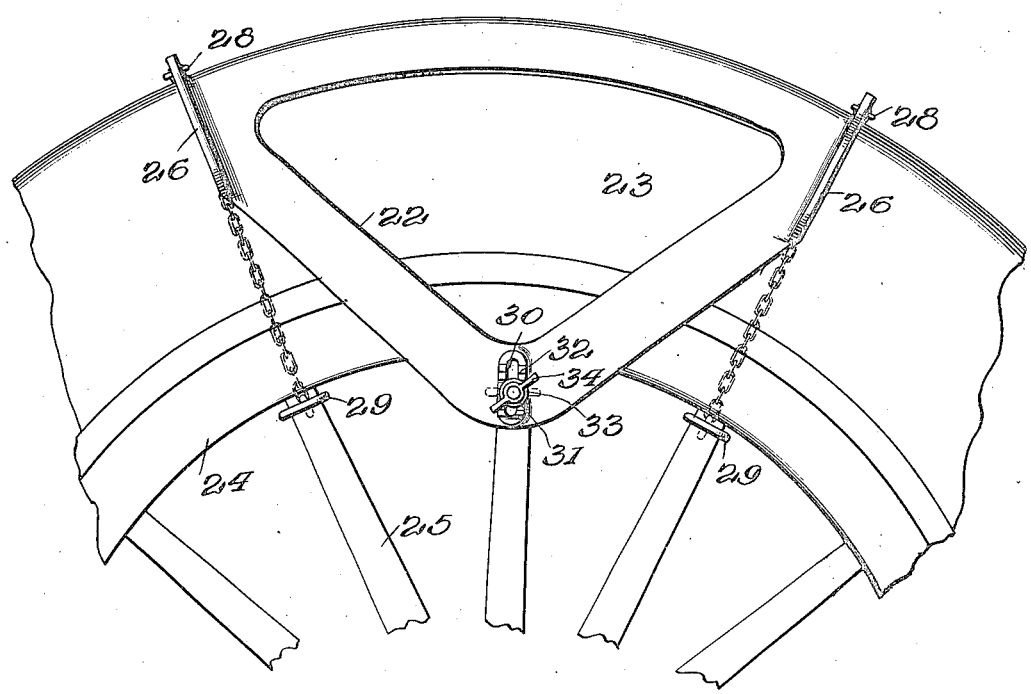
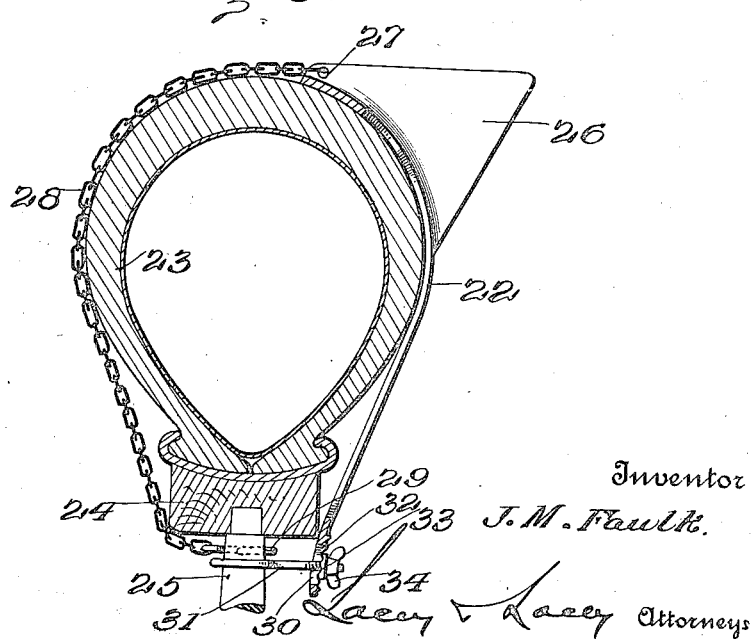

UNITED STATES PATENT OFFICE.

JAMES M. FAULK, OF ST. JOHN, KANSAS.

ATTACHMENT FOR WHEELS.

1,312,437.  Specification of Letters Patent.  Patented Aug. 5, 1919.

Application filed October 10, 1918. Serial No. 257,613.

*To all whom it may concern:*

Be it known that I, JAMES M. FAULK, a citizen of the United States, residing at St. John, in the county of Stafford and State of Kansas, have invented certain new and useful Improvements in Attachments for Wheels, of which the following is a specification.

This invention relates to attachments for preventing automobile tires, more particularly pneumatic tires, sticking in mud or sand, and has for one of its objects to simplify and improve the construction and increase the efficiency and utility of devices of this character.

Another object of the invention is to provide a device of this character arranged in a plurality of sections adapted to be attached to the tire at spaced intervals, and which does not require change of construction of the tire or of the wheel.

The invention is illustrated in the accompanying drawings, in which—

Figure 1 is a transverse section of a pneumatic tire having my improved attachment applied thereto;

Fig. 2 is a side elevation of the device as it appears upon a tire;

Fig. 3 is a detail plan view of one member of the attachment, showing a different form of wing;

Fig. 4 is an end elevation and Fig. 5 a side elevation of the device shown in plan in Fig. 3;

Fig. 6 is a side elevation of another form of the invention;

Fig. 7 is a detail sectional perspective view, the section being taken on the line 7—7 of Fig. 6;

Fig. 8 is a side elevation of another embodiment of the invention;

Fig. 9 is a central transverse section through the form shown in Fig. 8.

The improved device comprises body portions 10 hinged or hooked together centrally of the tread of the tire. The drawing shows a hinge connection 11 and the tire is shown at 12. The members 10 are curved at one portion to correspond to the curvature of the tire or casing and terminate adjacent the opposite sides of the felly, represented at 13. The terminal of one of the members 10 is united at 14 to a strap 15, the strap extending beneath the felly 13 and being detachably connected in any suitable manner to the terminal of the opposite member 10. The drawings show the detachable connection in the form of an eye 16 and a cotter pin 17.

Extending from the outer or tread portion of each of the members 10 is a lateral wing 18. The wings 18 may be separate from and attached in any suitable manner to the members 10 as shown in Figs. 1 and 2, or formed integral with the body members as shown in Figs. 3, 4, and 5. In Figs. 1 and 2 each of the wings is formed with a lateral flange 19 conforming to the body member and secured thereto by rivets 20 but the wings may be connected to the body portions in any other preferred manner. In Figs. 3, 4, and 5, the body portion 10 and the wing 18 are shown integral and pressed from a single sheet of metal, the wing tapering from the body member. In Fig. 5, the body member is shown provided with slots 21 to receive the fastening straps 15.

In the form shown in Figs. 6 and 7, the body portion 10 is extended longitudinally and carries a plurality of the wings 18. In this form of the invention, the body portions 10 are bent into segmental form longitudinally to conform to the curvature of the tire, while in the form shown in Figs. 1 and 2 the body portions 10 need not be longitudinally curved although they may be so curved.

In Figs. 8 and 9 is shown an embodiment of the invention consisting of a substantially triangular body or base plate 22 shaped to fit closely to the tire 23 and of such dimensions that its apex will be at the inner side of the felly 24 while its outer side will be approximately coextensive with the length of tire tread defined by three successive spokes 25 of the wheel, the apex being adjacent the intermediate spoke. At each outer corner of the body or base plate is a lateral wing 26 having an opening 27 adjacent the outer edge of the plate. In this opening is engaged one end of a chain 28 which is passed across the tire and then to that spoke in or near the plane of which the wing is located. At its free end the chain is equipped with a hook 29 which is engaged around the spoke. In the apex of the plate is a radial slot 30 which receives the stem or shank of a screw hook 31, the hook end of which engages around the spoke as shown in Fig. 9. Upon the outer face of the base plate, at the sides of the slot, are corrugations 32 which are engaged by a corrugated washer 33, a nut 34 on the threaded end of the screw hook being turned home against the washer to secure the parts together and the corrugations permitting the adjustment of the device to the thickness of the felly. With this construction, the device will prove effectual when applied to only one side of the wheel.

The body portions and the wings are of metal as light as possible consistent with the strains to which they will be subjected when in use. By this simple arrangement an effectual mud lug and anti-skidding attachment is produced which may be applied to tires of various forms and sizes and without structural change in the tire or other portions of the wheel.

The body members have their tread portions of such shape that they conform to the transverse outline of the tire and, consequently, permit the tire to be fully inflated so that cutting strain thereon is avoided. The inner terminal portions of the members extend on straight lines toward the felly so that when the retaining straps are fastened, the guard will be firmly secured in position yet may be easily and quickly removed when its use is not desired. It will be readily noted that the lateral wings project a considerable distance beyond the tread and sides of the tire and will, therefore, provide an extended surface to bear upon the sand or mud and serve as propellers to effect smooth travel. Moreover, the device will thoroughly protect the tire against the wear incident to attempting to drive the same unprotected through deep mud or sand.

Having thus described the invention, what is claimed as new is:

An attachment for wheels comprising a substantially triangular plate having lateral wings at its outer corners, flexible attaching devices extending from said corners of the plate to pass across the tire and engage the spokes, and an adjustable connection between the apex of the plate and the spoke intermediate the spokes engaged by the flexible attaching devices.

In testimony whereof I affix my signature.

JAMES M. FAULK. [L. S.]